(12) United States Patent
Champion et al.

(10) Patent No.: US 8,543,930 B2
(45) Date of Patent: *Sep. 24, 2013

(54) SYSTEM AND METHOD FOR HUMAN IDENTIFICATION PROOF FOR USE IN VIRTUAL ENVIRONMENTS

(75) Inventors: David F. Champion, Durham, NC (US); Jeffrey J. Smith, Raleigh, NC (US); Kevin J. Smith, Mount Pleasant, PA (US); David T. Windell, Raleigh, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/612,422

(22) Filed: Sep. 12, 2012

(65) Prior Publication Data

US 2013/0067573 A1    Mar. 14, 2013

Related U.S. Application Data

(63) Continuation of application No. 12/186,330, filed on Aug. 5, 2008, now Pat. No. 8,316,310.

(51) Int. Cl.
*G06F 3/048* (2006.01)
(52) U.S. Cl.
USPC ............... 715/757; 715/751; 715/848; 726/2; 726/14; 726/22; 713/182; 709/203
(58) Field of Classification Search
USPC ................. 715/751, 757, 848; 726/2, 14, 22; 713/96, 182; 709/203
See application file for complete search history.

(56) References Cited

U.S. PATENT DOCUMENTS

| | | | |
|---|---|---|---|
| 5,319,358 A | 6/1994 | Martinez et al. | |
| 5,319,722 A | 6/1994 | Oki et al. | |
| 5,734,909 A * | 3/1998 | Bennett | 710/200 |
| 5,815,657 A * | 9/1998 | Williams et al. | 705/35 |
| 6,209,103 B1 | 3/2001 | Schreiber et al. | |
| 6,643,775 B1 | 11/2003 | Granger et al. | |
| 6,868,498 B1 | 3/2005 | Katsikas | |
| 7,275,987 B2 * | 10/2007 | Shimakawa et al. | 463/9 |
| 7,565,330 B2 * | 7/2009 | Steeves et al. | 705/75 |
| 7,606,915 B1 * | 10/2009 | Calinov et al. | 709/229 |
| 7,624,277 B1 * | 11/2009 | Simard et al. | 713/182 |

(Continued)

FOREIGN PATENT DOCUMENTS

WO    WO 03/058518 A2    7/2003

*Primary Examiner* — Phenuel Salomon
(74) *Attorney, Agent, or Firm* — Scully, Scott, Murphy & Presser, P.C.; Daniel P. Morris, Esq.

(57) ABSTRACT

System, method and computer program product for verifying an avatar owner as a human user of an avatar in a virtual world environment in which humans interact through avatars via client devices in network communication with a server device. A request for challenging an avatar in the virtual world environment is received to determine whether that avatar is controlled by an application program user (bot). A user client device associated with a challenged avatar is identified and a Human Identification Proof (HIP) message for detecting a human user versus a bot controlling the challenged avatar is generated and communicated, for receipt at the identified user client device. It is determined from the response, whether the user is a bot or a human user. If a challenged avatar is determined to be a bot, then the server device prevents the challenged avatar from further interaction in the virtual world environment.

20 Claims, 2 Drawing Sheets

(56) References Cited

U.S. PATENT DOCUMENTS

| | | | |
|---|---|---|---|
| 7,680,891 B1* | 3/2010 | Pongsajapan | 709/206 |
| 7,945,952 B1* | 5/2011 | Behforooz | 726/22 |
| 8,019,127 B2* | 9/2011 | Misra | 382/115 |
| 8,145,914 B2 | 3/2012 | Steeves | |
| 8,209,741 B2* | 6/2012 | Elson et al. | 726/2 |
| 2003/0204569 A1 | 10/2003 | Andrews et al. | |
| 2004/0199597 A1 | 10/2004 | Libbey et al. | |
| 2005/0021649 A1* | 1/2005 | Goodman et al. | 709/207 |
| 2006/0026242 A1 | 2/2006 | Kuhlmann et al. | |
| 2007/0071200 A1 | 3/2007 | Brouwer | |
| 2008/0066014 A1 | 3/2008 | Misra | |
| 2008/0301808 A1* | 12/2008 | Calo et al. | 726/23 |
| 2008/0310604 A1* | 12/2008 | Agarwal et al. | 379/88.18 |
| 2009/0044264 A1* | 2/2009 | Ramanathan et al. | 726/14 |
| 2009/0077628 A1 | 3/2009 | Elson et al. | |
| 2009/0077629 A1 | 3/2009 | Douceur et al. | |
| 2009/0144267 A1* | 6/2009 | Cook et al. | 707/5 |

\* cited by examiner

SYSTEM AND METHOD FOR HUMAN IDENTIFICATION PROOF FOR USE IN VIRTUAL ENVIRONMENTS

CROSS-REFERENCE TO RELATED APPLICATIONS

This application is a continuation of currently pending U.S. patent application Ser. No. 12/186,330 filed Aug. 5, 2008, the entire contents of which is incorporated herein by reference.

BACKGROUND

1. Field of the Invention

The invention relates generally to computer-generated virtual world environments, and particularly, to a system, method and computer program product for providing human identification proofs verifying an avatar in the virtual world environment as being controlled by a human user, as opposed to an automated program, e.g., "bot".

2. Description of the Related Art

A virtual world is a computer-based simulated environment where avatars (i.e., a virtual representation of a user) inhabit and interact with other avatars. In a virtual world (e.g., Second Life, World of Warcraft, Google Lively, Activeworld™), a human typically projects himself/herself into the virtual world in the form of an actor (e.g., a motional avatar) that can interact within the virtual world. However, not all worlds require avatar representation as some provide first-person views only and others involve no "sight" of others.

Published PCT Patent Application No. WO03058518A2, incorporated by reference herein, provides an avatar user interface system and provides general teaching of virtual world environments. Examples of virtual worlds that include, but are not limited to, Second Life® (http://en.wikipedia.org/wiki/Internet_bot, Retrieved 27 August 07), 3DVirtual, IMetaverse, and MMORPGs (Massively Multiplayer Online Role-Playing Games).

"Internet bots", also known as web robots, WWW robots, or simply bots, are software applications that run automated tasks over the Internet (See http://en.wikipedia.org/wiki/Internet_bot). Typically, bots perform tasks that are both simple and structurally repetitive, at a much higher rate than would be possible for a human editor alone."

Programs and algorithms can be used to create bots that mimic actions of avatars within virtual environments. Bots could be a particular issue within Virtual Store Environments, creating a three-dimensional version of email spamming and junk mail. For example, as more retailers enter the realm of Second Life, bots could be used as a viral marketing technique as avatars are created for no reason other than to promote products, hassle customers, etc.

This type of activity is already a concern for Massively Multiplayer Online Roleplaying Games (MMORPGs), where bots are used to "farm" resources that would take a significant amount of time (and tedium) for a human player to obtain. In gaming environments, these 'bots' are, for the most part, merely a nuisance that violates the terms and conditions of that particular game. However, in other environments, the presence of bots can have more drastic implications. Within a virtual retail store, for example, these bots could interfere with the profitability of a particular store by annoying clients and customers, reducing productivity, etc. In another example, within an online poker environment, "bots" can attend to many more games than human players and can compromise the fairness of the game.

In another form of 'botting,' "Click fraud" is a type of internet crime that occurs in pay per click online advertising when a person, automated script, or computer program imitates a legitimate user of a web browser clicking on an ad, for the purpose of generating a charge per click without having actual interest in the target of the ad's link." (http://en.wikipedia.org/wiki/Click_fraud, Retrieved 27 August 07).

CAPTCHAs (Completely Automated Public Turing tests to tell Computers and Humans Apart, trademarked by Carnegie Mellon University) are challenge-response tests (used to determine whether users are human. In short, because computers are unable to solve a CAPTCHA, a correct answer begets the presumption that a user is human (http://www.captcha.net/, Retrieved 27 August 07). CAPTCHAs can be qualified as Human Identification Proofs (HIPs), an inverse version of a Turing test.

Character-based HIPs are the most widely employed HIPs in commercial web sites today because of their ease of use: a user reads a HIP comprising distorted or warped characters and in the entry field below the HIP, typically must correctly type the characters in order to prove he/she is a human.

Current methods employed to prevent spamming includes those systems and methods as described in: U.S. Pat. No. 6,868,498 B1 directed to an email system that verifies that a suspected nonhuman message is human by requesting a confirmation message; US 2007/0071200 A1 directed to a system that surfaces randomly selected phonetically encoded messages, which must be read and confirmed as human; US 2006/0026242 directed to a system for generating an automated group spam information database; US 2004/0199597 directed to a method for challenging outbound emails with a CAPTCHA to see if they are real; and, US 2003/0204569 A1 directed to a system that initiates surfacing of a CAPTCHA when a virus-infected email is discovered to determine whether it was a computer or human sender.

However, it would be highly desirable to provide a system and method for human identification proof method for use in a virtual world environment as well as other online gaming environments, and particularly, a system and method for verifying whether an avatar, representing a user in a virtual world environment, is controlled by a human user or an automated program user, i.e., a bot.

SUMMARY OF THE INVENTION

The present invention addresses the needs described above by providing a system, method, computer program product, and computer program storage device for human identification proof method for use in a virtual environment.

In accordance with the invention, the infrastructure and methodology for presenting a CAPTCHA (a challenge-response test) when the aforementioned 'botting' is suspected that enables policing of virtual environments with minimal interference to human users.

Further, in accordance with the invention, the infrastructure and methodology for presenting a CAPTCHA includes triggers for detecting suspicion of botting and, raising a resultant CAPTCHA challenge by an algorithm determining the 'humanness' of actions (currently utilized in some form by websites such as Google), an administrative user, a single (or a collection/series of) users, etc., or a combination of any or all of the aforesaid methods.

Thus, in accordance with a first embodiment, the invention contemplates a system, method and computer program product for verifying an avatar owner as a human user of an avatar in a virtual world environment in which users may interact through avatars, representing each one or more users visually, and wherein users, interact through their the representing avatars, via client devices in network communication with a server device. The method includes receiving a request for challenging an avatar in the virtual world environment to determine whether that avatar is controlled by an application program user (bot). Then, in response to the challenging, a user client device associated with a challenged avatar is identified and a HIP message for detecting a human user versus a bot controlling the challenged avatar is generated and communicated, for receipt at a user client device. The HIP message requires a response from the corresponding user. It is determined from the response, whether the user is a bot or a human user. If a challenged avatar is determined to be a bot, then the server device prevents the challenged avatar from further interaction in the virtual world environment. Alternatively, other 'punishments' could be exacted upon the challenged avatar. For instance, accounts could be temporarily disabled, an administrator may investigate the failed CAPTCHA then or at a later time, a second (or third time . . . ) more complicated CAPTCHA could be issued for verification, etc.

Thus, according to a first aspect of the invention, there is provided a method for verifying an avatar owner as a human user of an avatar in a virtual world, the method comprising:

providing, by a server device, a communication system for establishing a virtual world environment in which users may interact through avatars, representing each one or more users visually, in the virtual world environment;

enabling, via client devices associated with one or more users, the users to interact through their the representing avatars, the client devices and server device communicating over a network; and, receiving request for challenging an avatar in the virtual world environment to determine whether the avatar is controlled by an application program user via a client device;

identifying, in response to the challenging, a user client device associated with a challenged avatar;

generating, for receipt at a user client device, a HIP message to detect a human user versus an application program user controlling a suspect avatar;

sending to the user client device a HIP message, the HIP message requiring a response from the user;

determining, from the response, whether the user is an application program user (bot) or a human user; and, preventing, at the server device, the challenged avatar from further interaction in the virtual world environment, or performing any other punitive action, when the challenged avatar is determined to be a bot.

Further to this aspect of the invention, the method for verifying further comprises:

providing, at each client device, an interface, operable by a corresponding user, for enabling users to control their representing avatar on the corresponding client device; and, communicating the HIP message to the suspect avatar via a network connection for receipt at a interface of that user's corresponding client device.

In one example embodiment, the HIP message communicated to a user client device of a challenged avatar is a Completely Automated Public Turing tests to tell Computers and Humans Apart (CAPTCHA) message, the CAPTCHA message generated for display via the interface of the challenged avatar's controlling user client device. The CAPTCHA could be presented in a variety of ways, including, but not limited to existing methods such as those described at captcha.net.

Further to this aspect of the invention, the generating a HIP message is performed at the server device establishing the virtual environment, or is provided by a $3^{rd}$ party server device in communication with the server device via the network.

Moreover, the generation of a HIP message is initiated by the server device establishing the virtual world environment, the CAPTCHA message generated for receipt at a user device associated with a challenged avatar.

Alternatively, the generation of a HIP message is initiated by a user represented by a first avatar in the virtual world environment, the CAPTCHA message generated for receipt by a second challenged avatar at a corresponding user client device associated with the challenged second avatar.

Moreover, prior to initiating a challenge HIP, the method further verifying whether the initiator of the HIP is a bot. In such an embodiment, the first avatar (e.g., initiator) must first correctly answer a CAPTCHA to verify that it is human-based as a prerequisite to issuing the CAPTCHA. This would reduce the likelihood of human avatars spamming (i.e., performing repeatedly) the "HIP surface" action and the creation of bots intended to spam the "HIP surface". Thus, the method of verifying further comprises:

initiating, by the server device, a CAPTCHA message to a user device associated with the first avatar, receiving, at the server device, a response from the first avatar, the response submitted via that user's client device;

determining, from the response provided, whether the initiator is a bot or a human user; and, preventing, via the server device, the first avatar from initiating a challenge in the virtual world environment when a bot initiator is determined.

Moreover, the method for verifying further comprises: limiting, by the server device, a number of HIP challenges (HIP surfaces) before a suspect avatar is determined as a bot.

Moreover, the step of determining, from the response, whether the user or initiator is a bot or a human user comprises:

evaluating the response according to criterion upon which automated program behavior (botting) behavior is determined, the method further comprising:

varying, by either of the server device or the $3^{rd}$ party server device in communication with the server device via the network, the criterion to thereby control an occurrence of false alarms to human users and an occurrence of bots that go undetermined.

In an additional aspect of the invention, the method step of determining, from an avatar's interactions in the virtual world environment, and from responses received from the user or initiator, whether a challenged avatar is controlled by a bot, is performed by a system of users (i.e., a collection or series of users) comprising the first avatar, or an administrator user that who confront the second avatar if CAPTCHA is not correctly responsed. In this aspect, a provided collection/series/system of users determines the "humanness" of actions.

Further to this determining step, the method for verifying further comprises:

communicating, by the server, an escalation of HIP or CAPTCHA messages to a user device associated with a challenged avatar, and receiving a succession of responses to verify human versus application program user, the escalation comprising issuing one or more of: avatar-issued CAPTCHAs, administrator-issued CAPTCHAs, algorithms requiring avatar responses, or automated CAPTCHAs, or combinations thereof, to the challenged avatar.

Further to this aspect of the invention, the method step of varying a criterion comprises one or more of:

varying the types of HIPs, varying the number of HIPs before initiating the escalation of HIP or CAPTCHA messages, varying an accuracy criterion to determine when to pass an avatar challenge request, the criterion incorporating factors comprising one or more of: an amount of risk imposed by bots, a frequency upon which a user can be challenged to provide proof of 'humanness', a number of incorrect responses provided by a user of a challenged avatar, and an amount of time required to provide proof of 'humanness' in the response, or combinations thereof.

In an additional embodiment of the invention, the method of verifying further comprises:

providing a recording device operable in conjunction with a client device;

presenting, via a interface at a client device, a CAPTCHA comprising a series of words that requiring recital from a human user into the recording device; and, determining from the recorded user recital, presence of a human user.

BRIEF DESCRIPTION OF THE DRAWINGS

The objects, features and advantages of the invention are understood within the context of the Description of the Preferred Embodiment, as set forth below. The Description of the Preferred Embodiment is understood within the context of the accompanying drawings, which form a material part of this disclosure, wherein.

DESCRIPTION OF THE PREFERRED EMBODIMENT

The present invention provides for the issuing of CAPTCHA's and like human identification proof mechanisms to avatars or like virtual characters in a virtual environment.

Figure 1:
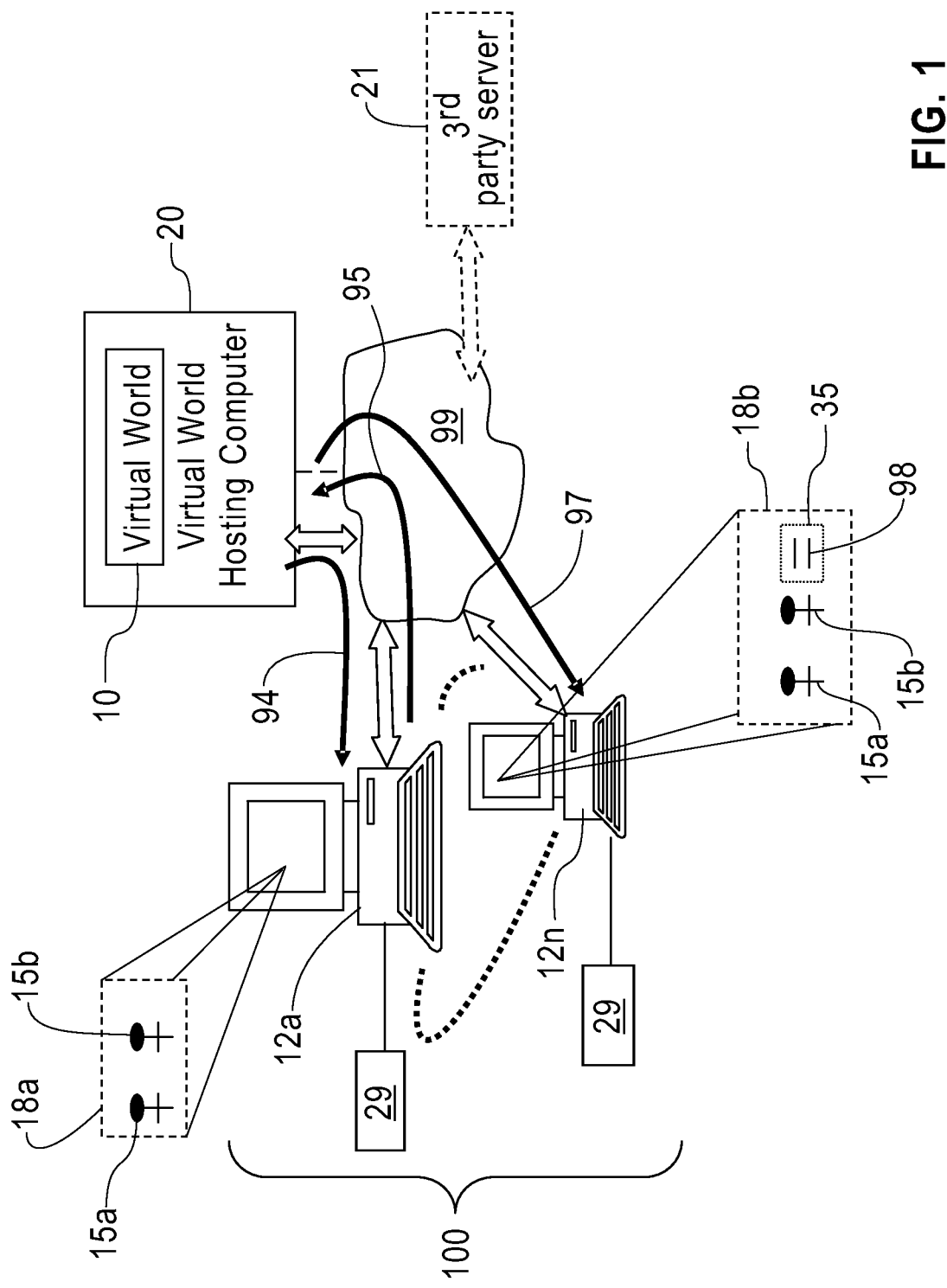
FIG. 1 shows a system diagram depicting a high level logical architecture and method of the present invention; and, FIG. 2 illustrates conceptually a method diagram for processing (issuing and responding to) CAPTCHAs in accordance with the present invention.

FIG. 1 depicts an illustrative component diagram of one embodiment of the present invention. In FIG. 1, there is a computer-generated virtual world environment (e.g., Second Life®) 10 and, a real world environment 100. As shown in FIG. 1, in one embodiment, a hosting server or like computing engine 20 generates the virtual environment 10 including a graphical representation of objects and the boundaries of the virtual environment. Typically, hosting server 20 generates one or more graphical user interfaces that present information to the user and allow the user to navigate and input information into system 10. Further, typically, the virtual environment can be represented on a user device in two or three dimensions and may comprise any environment that may programmed via a modeling language, e.g., virtual reality modeling language (VRML, pronounced "ver-mel"). VRML is a standardized language for describing the animation and three dimensional modeling of geometric objects. It is understood that virtual worlds are programmed in other types of modeling languages, C, C++, X3D, U3D, 3DMLW, among other languages. Similarly, the computing engine can be used to generate the virtual characters for interacting in the virtual environment.

FIG. 1 further depicts a mechanism for communicating between the virtual world environment 10 and the real world 100. In one embodiment, there is a virtual world hosting computer, e.g., server device 20, in the virtual world environment 10 that is equipped with programs, APIs, functions, and subroutines to enable interactions within and operate the virtual world 10. The virtual world hosting computer 20 may store configuration and setting information of each user registered in the virtual world 10. A user operates client computing devices 12a, . . . , 12n that provide functionality for interfacing the user to the virtual world environment. Thus, the client computing devices 12a, . . . , 12n that provide functionality for interfacing the user to the virtual world environment as depicted in FIG. 1, can further include a transceiver having appropriate circuitry for communicating over the network. The transceiver can be implemented as a wired or wireless modem, a network interface card, a network port, and the like that enables communication with the network. The system can also include a keyboard, a mouse or other controller such as a joystick, activatable buttons, touch-enabled apparatuses and the like for inputting commands and making selections. Further, the system includes a media recording/playback device 29, e.g., digital or analog recorder, associated and operatively connected with a client device 12a, . . . 12n that enables a user to record any visual and audio information as specified for implementing a particular HIP, and communicate the recording, as will be described in greater detail herein below.

Thus, the user may login the virtual world 90 via a network 99 via communications connections via networks, gateways, routers, and computers that use Transmission Control Protocol/Internet Protocol ("TCP/IP") and other packet based protocols to enable the plurality of client devices 12a, . . . , 12n having avatars to be represented in the virtual world environment 10. In one embodiment, the real world to virtual world interfacing computer, i.e., client device 12a, . . . , 12n may be a user's personal computer operating as a client. However, may comprise any computing device (e.g., a computer, a handheld, a mobile or laptop PC, or a two-way wrist radio) that provides data to be passed from the real world 100 to the virtual world 90, and vice versa. The virtual world hosting computer 20 establishing the virtual world environment 10 communicates with the real world to virtual world interfacing client device 12a, . . . , 12n via the IP (Internet Protocol) network 99 and client devices likewise, communicate with the host computer 20 across the network 99, which may include the Internet or private intranets or both.

As further depicted in FIG. 1, the hosting computer 20 is a computer apparatus for creating a virtual world environment 10 wherein an on-line user is represented in the graphic user interface at the client device 12a, . . . , 12n by a virtual avatar object, e.g., objects shown as 15a, 15b. The computing apparatus further includes an associated memory storage device for maintaining and updating a record of the virtual world participant i.e., the avatar, that represents a user in the real world operating via that user's computer device 12a, . . . , 12n. Particularly, computer processes are employed, such as client-server computer communications, for the virtual world that permit on-line users to navigate, interact and/or conduct activities within the virtual world including sending of messages.

In one example embodiment, VRML or like virtual world programming language, allows a two- or three-dimensional scene(s) or world(s) to be manipulated in an interactive manner over the Internet 99 and shared by multiple users. Virtual reality worlds are generally defined with reference to an x-axis, a y-axis, and a z-axis so as to allow movement with six degrees of freedom. VRML provides for the organization and interaction of three dimensional objects and scenes in a hierarchical fashion within a virtual three dimensional space.

Particularly, in one example embodiment, a browser device, e.g., programmed to process VRML and present on the user's (client) devices 12a, . . . , 12n in FIG. 1, is used to view a three dimensional virtual world constructed using VRML. The VRML browser may be a helper program or plug-in to a web browser that is launched when the web browser detects that a file being downloaded is a VRML document. The VRML browser provides means for allowing the user (i.e., represented by that user's Avatar 15a, 15b) to move around or navigate the three dimensional virtual world. Typically, a user corresponding to each avatar 15a, 15b interacts via their networked connections to the virtual world 10 provide the human control of their respective avatar.

In addition to navigating through a VRML world, a VRML browser providing an interface display 18a, ..., 18n (i.e., at each respective user client device) shares the virtual world with one or more other VRML browsers. In this context, a user of a VRML browser may select a three dimensional representation of him/herself, i.e., an "avatar", comprising an object. The user then navigates in the world with other avatars that represent other users in that world (e.g., other clients). Thus, as a user's avatar moves through the world the user is able to see other users' avatars moving as well, and vice versa, via interface displays 18a, ..., 18n at respective client device 12a, ..., 12n.

The positions of the avatars within a VRML world are tracked by the virtual world hosting computer 20. Thus, as the position or behavior of an avatar changes, the changes are detected by the hosting server, or a central object server (not shown) and rebroadcast out to the client web browsers at devices 12a, ..., 12n. Moreover, the virtual world hosting computer 20, operating either alone or in conjunction with other server/computing devices, (not shown), maintains a list of present avatars interacting in said virtual world environment and corresponding information for identifying client computing devices 12a, ..., 12n operating to control said present avatars, e.g., by maintaining information such as the user's respective client device's IP addresses.

In the embodiment of the invention, the virtual world hosting computer 20, operating either alone or in conjunction with other server/computing devices, enables an avatar (representing a user at a client device) to initiate, via that avatar's controlling client device, a HIP challenge message, such as a CAPTCHA to challenge a suspecting avatar exhibiting non-human behavior. Thus, in a first embodiment, the HIP could be presented as a standard CAPTCHA (characters within a distorted field, http://en.wikipedia.org/wiki/Captcha, last retrieved June 2008).

In a further embodiment, in accordance with the reCAPTCHA project, a plug-in may be employed for executing at a client device via which user's may interact via representing avatars in a virtual world environment. In one non-limiting example, a plug-in may be employed and is available for WordPress, MediaWiki, PHP, Perl, Python, and many other computing environments.

For example, as shown in FIG. 1, a first avatar, e.g., depicted as avatar 15a, and second avatar, e.g., depicted as avatar 15b, are shown interacting in a rendered virtual world environment depicted via browser displays interfaces 18a, 18n, of respective user's client devices, e.g., 12a and 12n. In one embodiment of the invention, the virtual world hosting computer 20, at its own initiative, operates to generate the CAPTCHA or other HIP message 94 to a user device, associated with a suspected avatar exhibiting non-human behavior in the virtual world, as identified by the hosting server for communication to an identified user client device associated with the suspect avatar in the virtual world 10. Alternatively, in one embodiment, the virtual world hosting computer 20 responds to a first avatar's request message 95, e.g., generated at a user's client device, e.g., device 12a, through its representing avatar 15a, to request the host computer 20 to surface a HIP message to effectively challenge a second avatar, e.g., avatar 15b, in the virtual world, and verify that second or suspect avatar's "humanness". In this embodiment, the hosting computer 20 responds to received request message 95 by generating a communication 97 that includes a HIP or CAPTCHA challenge 98 (either generated by the hosting device 20, or alternately, it could be generated by another server device 21 (e.g., www.captcha.net) in communication with the network 99, and which message 97 is communicated to the challenged avatar's device 12n, e.g., for surfacing as HIP or CAPTCHA challenge pop-up display 35 directed to the avatar, e.g., avatar 15b, who's humanness is being tested, via that challenged avatar's client device 12n.

From the perspective of the virtual world, an avatar, as controlled by a user, e.g., at client device 12a, via a respective interface devices (client browsers 18a) in the real world environment 100, may initiate the generation of the HIP or CAPTCHA via that user's corresponding client 12a which requests, via request message 95, the hosting server or like web-server, to generate the HIP or CAPTCHA message 97, for receipt by the challenged avatar, i.e., a second avatar suspected as being an automated program user or "bot", at that user's client device, e.g., 12n, whose user is to be tested. The provision of a HIP message (e.g., the CAPTCHA) to the challenged avatar, is communicated by the hosting server 20, or a third-party server 21 to the associated client's device, e.g., client 12n, as shown via the communication link 97 (e.g., which may include one or more of: a wireless communication link, an optical communication link, a wired communication link, a satellite communication link, or under the water communication link). It is understood that the generation of a HIP or CAPTCHA may be initiated in the same way as any other user action within an environment such as Second Life, e.g., a clickable on-screen action, a key press sequence, a hot-key, or all of the above.

It is understood that the HIP or CAPTHCA message communicated according to the invention, challenges a suspect avatar by requiring a message be sent to that avatar's client device with a test that requires verification of content that is easily understood by a human being, but not understood by an automated computer program such as those used by bots or other agent programs.

Particularly, in the virtual world environment, a first avatar in a virtual world issues a CAPTCHA to a second (suspect) avatar to assist in determining whether the second avatar is human-based or a program/bot. The CAPTCHA could be presented in a variety of ways, including, but not limited to existing methods such as those described at www.captcha.net. This presentation to the challenged avatar's user is a measure to prevent presence of SPAM as generated by web "bots" or other software agent or automated computer program. If the client fails to successfully answer the test within a relatively short period of time (e.g., fails the HIP or CAPTCHA), this indicates automated computer involvement as no computer program can read distorted text as well as humans can. In response to failing the HIP "challenge" or providing an incorrect response (one or more times, as specified within a particular embodiment of the invention) that challenged avatar's involvement in the virtual world is disabled, intervened with, or suspended, and the challenged avatar is prevented from further navigating within the virtual world. Alternately, other 'punishments' could be exacted. For instance, accounts could be temporarily disabled, an administrator may investigate the failed CAPTCHA then or at a later time, a second (or third time . . . ) more complicated CAPTCHA could be issued for verification, etc. As bots cannot navigate sites protected by CAPTCHAs the method prevents abuse from "bots," implemented as avatars in the virtual world.

In one alternate embodiment, a CAPTCHA 98 may be presented via communicated message 97 to a client device, e.g., client 12n, that is generated to present a series of words, e.g., words arranged within a sentence structure, that requires recital from a human user. Thus, in this aspect of the invention, as further shown in FIG. 1, a client device is provided with a recording device 29 that is operable in conjunction with the client device 12a, . . . , 12n to record a user recital as indicated by this CAPTCHA.

Further to this embodiment, a method of operating the system includes presenting, via a client device browser interface, e.g., 18a, a CAPTCHA comprising a series of words requiring recital from a human user into the recording device 29 shown in FIG. 1; and, determining from the recorded user recital, presence of a human user. For example the CAPTCHA lines may comprise a line of poetry or lyrics from a song, for example, or include any presentation that would complicate the recital process for a computer without increasing the task complexity for authentic (human) users due to the natural inflections of human users. The responsive recital from a user, is recorded and saved in a form that is readily transmitted or communicated over the network via messaging, to a user device, e.g., an administrator, who can verify the "humanness" of the response and determine from the recital, presence of a bot.

In a further alternate embodiment, a CAPTCHA 98 may be presented via communicated message 97 to a client device, e.g., client 12n, that is generated to present a list of required actions that a human user would be able to complete, but that a bot would not be programmed to complete. Example actions that may be performed may include, but not limited to, actions such as: 'spin your avatar around counter-clockwise three times' or 'tell me what time it was half an hour ago'. Virtually any action that may be performed using the input device(s) used by a particular user can be used.

In an additional embodiment, a first avatar, e.g., 15a, representing a user at client device 12a, must first correctly answer a CAPTCHA to verify that it is human-based as a prerequisite to issuing a CAPTCHA to a second avatar, e.g., avatar 15b, in the virtual world environment 10. This would reduce the likelihood of human avatars spamming (i.e., performing repeatedly) the "human identification proof (HIP) surface" action. Avatars could also be given a limited number of "HIP surfaces", for example, in order to limit the opportunity to spam the action or use it for a purpose other than intended (e.g., such as to distract or delay other users during an attack).

As a non-limiting example, a user (player) in World of Warcraft$^{SM}$ may initiate surfacing of a human identification proof to another player he or she suspects is a bot (with a limit on the number of unsuccessful "human?" (challenged) actions to prevent spamming this action). If the character does not successful complete the HIP (or a series of HIPs following unsuccessful entry), then the hosting server responds with activity including, but not limited to: e.g., removal from the server, intervention from an administrator, and/or other multiple forms of punishments or a series of punishments may be implemented. Further, to prevent bots themselves from spamming the 'human?' request, the initiator of the HIP could be asked to complete a CAPTCHA as well.

That is, prior to initiating a challenge HIP, the system hosting server 20 further verifies whether the initiator of the HIP is a bot, by initiating, via the server hosting device or like computing device, a CAPTCHA message to a user device, e.g., 12a, associated with the first avatar, e.g., avatar 15a. At the server hosting device 20, a response from the first avatar is received, the response being submitted via that user's client device, 15a. The server or like hosting device, or, as will be explained in greater detail below, a user or group of users, then determines, from the response provided, whether the initiator is a bot or a human user. Depending upon the results of the response, which is caused to be evaluated according to various criteria, the hosting device or server may prevent the first avatar, e.g., avatar 15a, from initiating a challenge in the virtual world environment when the initiator is determined to be a bot.

It is understood that the criterion upon which automated program behavior (botting) behavior is determined, may be varied by either of the hosting server device or the third party server device in communication with the server device via the network, or users, such as an administrator. The criterion being varied for a variety of purposes, such as to control an occurrence of false alarms (i.e., challenges to human users) and to control an occurrence of bots that go undetected. As mentioned herein above, in an additional embodiment of the invention, a collection/series/system of users may operate in conjunction to evaluate the results of the response according to various criteria, to determine the "humanness" of an avatar's interactions in the virtual world environment. The system of users may include the first avatar who initiated the challenge, or an administrator user (not shown) that may confront the second (suspect) avatar if CAPTCHA is not correctly responsed by that suspect avatar. Particularly, an administrative display console (not shown) can be used within the system enabling a user to administratively issue the CAPTCHA message 98, e.g., permit an administrator to manually input data or select the CAPTCHA and issue it to an avatar either with or without other requests.

Figure 2:
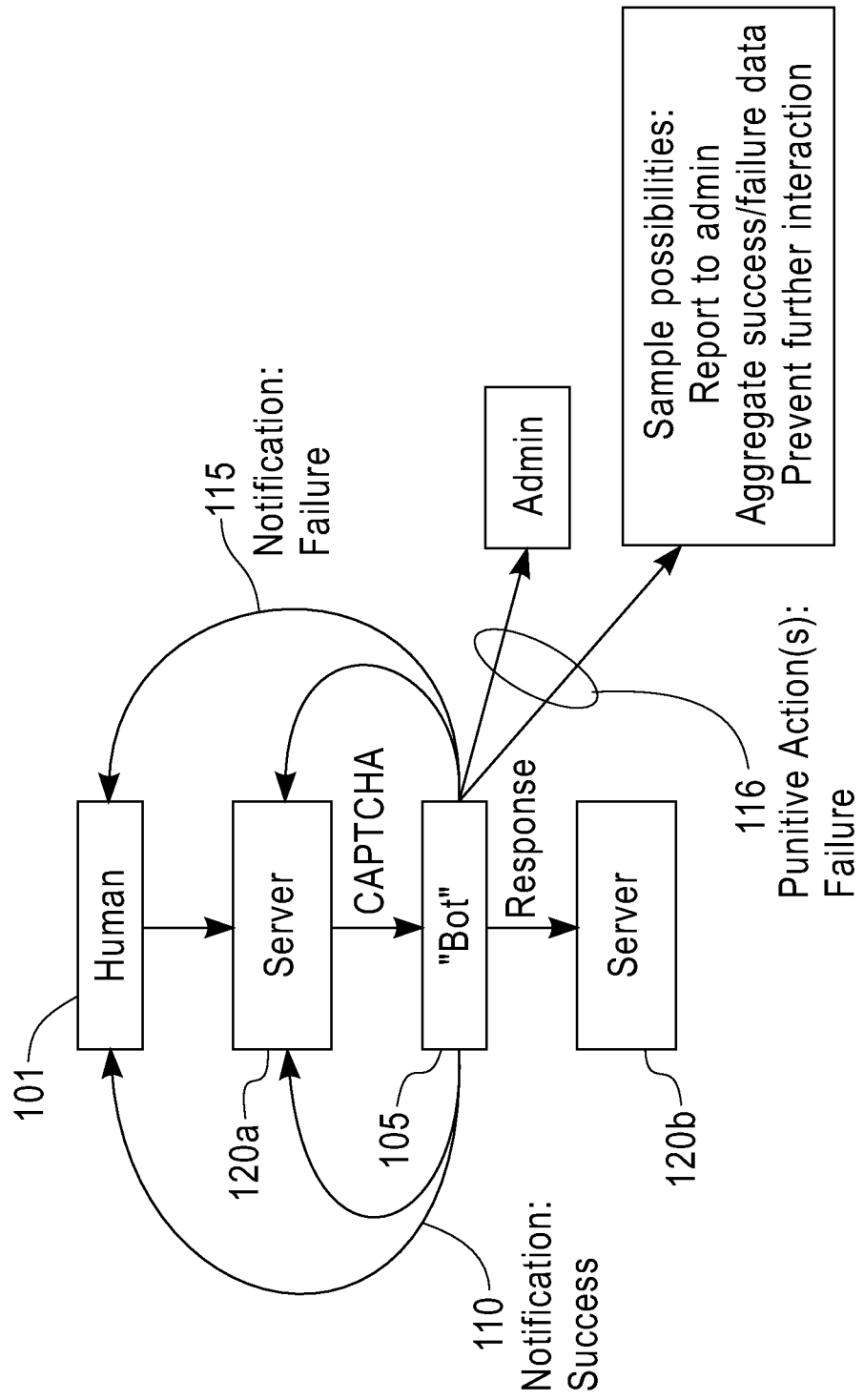

FIG. 2 illustrates conceptually a method diagram for processing (issuing and responding to) CAPTCHAs in accordance with the present invention. As shown in FIG. 2, a human participant 101 represented by an avatar interacting in a virtual world, communicates via an interface provided via the server device 120a, to issue a CAPTCHA to a suspected bot (challenged avatar) 105. The server device 120a receives commands generated at the user's device and responds to commands to implement the functionality for issuing aHIP or CAPTCHA to the suspected bot 105. The "bot" or, a user represented by the avatar that is challenged, is prompted to respond via that server device 120b which may be the same or different server as server 120a. If the challenged avatar is represented by a human participant, that user will most likely respond and if responded to appropriately, a success notification message 110 is communicated to the challenging human participant 101 and the "bot" 105 and such success notification may be indicated in the display interface providing the virtual world at the human participant devices (not shown) interfacing with servers 120a,b. Alternately, if the challenged avatar is represented by a bot, there will most likely not be any response, or at least a response that may not be appropriate, in which case a failure notification message 115 is communicated to the challenging human participant 101 and the "bot" 105 such failure notification may be indicated in the display interface providing the virtual world at the human participant devices (not shown) interfacing with servers 120a,b. Via the server device, any success and/or failure notification messages emanating as a result of a determining successful or failed CAPTCHA responses, may be further communicated as messages 116 to an administrator via an administrator's computing device (not shown) interfacing with server 120b. These success/failure notifications may be aggregated and/or analyzed to determine an appropriate action: e.g., disable the challenged avatar's involvement in the virtual world, intervene with, or suspend the challenged avatar's involvement in the virtual world and/or preventing the challenged avatar from further navigating within the virtual world. Alternately, other 'punishments' could be exacted. For instance, accounts could be temporarily disabled, an administrator may investigate the failed CAPTCHA then or at a later time, a second (or third time . . . ), notifications could be communicated to one or many additional non-administrative users, and/or initiate issuance of more complicated CAPTCHAs for verification, etc.

For example, further to any of the above-identified embodiments of the invention, in view of FIG. 2, the hosting server device 120a,b, may initiate an escalation of HIP or CAPTCHA messages to a user device associated with a challenged avatar, and receive a succession of responses to verify human versus application program (botting) behavior. That is, the process described in FIG. 2 may be iterated such that the monitoring administrator, or, other users may issue a succession of CAPTCHA's and receive respective responses for evaluation. The determination of which type of CAPTCHA's to be issued may be based according to criteria used to evaluate the types of CAPTCHA responses received. The escalation includes issuing one or more of: avatar-issued CAPTCHAs, administrator-issued CAPTCHAs, algorithms requiring avatar responses, or automated CAPTCHAs, or combinations thereof, to the challenged avatar.

Further to the above-described aspects and embodiments of the invention, the criterion upon which an avatar's response is evaluated by the hosting server, an administrator, a user, or system of users, for determining whether that avatar is a human or bot, comprises one or more of: varying the types of HIP messages communicated, varying a number of HIP messages before initiating the escalation of HIP or CAPTCHA messages, varying an accuracy criterion to determine when to pass an avatar challenge request, the criterion incorporating factors comprising one or more of: an amount of risk imposed by bots, a frequency upon which a user can be challenged to provide proof of 'humanness', a number of incorrect responses provided by a user of a challenged avatar, and an amount of time required to provide proof of 'humanness' in the response, or combinations thereof.

In additional embodiments of the invention, the hosting server 120a,b of FIG. 2 may randomize and/or otherwise vary the HIP methods presented to escalate the difficulty and effectiveness of the HIP, which may adapt to improved bot programming. Thus, the use of novel/evolving CAPTCHAs within the randomization is the 'adaptation' for improved reliability as bot programming improves.

In additional embodiments, there is devised a mechanism to defer the issuance of CAPTCHAs in an effort to thwart attempts at exploiting issued CAPTCHAs for purposes other than intended (e.g., such as delaying one's ability to attack within a MMPORPG).

This embodiment could be extended to any virtual environment, and for any conceivable application(s) that make use of an avatar user interface system. Some examples of significant commercial applications include, but are not limited to: conferences, meetings, e-learning tutorials, product presentations, exhibitions. call switchboard, multi-tasking communication tool, security, interactive games, collaborative work, shared space virtual reality, social exercise, etc. For example, this method could also be applied to other gaming situations, such as typical first-person-shooter multiplayer games (e.g., Halo) or online gambling (e.g., FullTiltPoker.com).

The system can include an information processing system having suitable hardware and software for communicating with the various components of system 100. For example, the system can include a personal computer system, a handheld device, or the like.

In one embodiment, the present invention is implemented or realized as hardware through a computer, which includes a general purpose processor, a memory device, a display device, a disk device, a CD-ROM drive, etc.

Although the preferred embodiments of the present invention have been described in detail, it should be understood that various changes and substitutions can be made therein without departing from spirit and scope of the inventions as defined by the appended claims. Variations described for the present invention can be realized in any combination desirable for each particular application. Thus particular limitations, and/or embodiment enhancements described herein, which may have particular advantages to a particular application need not be used for all applications. Also, not all limitations need be implemented in methods, systems and/or apparatus including one or more concepts of the present invention.

The present invention can be realized in hardware, software, or a combination of hardware and software. A typical combination of hardware and software could be a general purpose computer system with a computer program that, when being loaded and executed, controls the computer system such that it carries out the methods described herein. The present invention can also be embedded in a computer program product, which comprises all the features enabling the implementation of the methods described herein, and which—when loaded in a computer system—is able to carry out these methods.

Computer program means or computer program in the present context include any expression, in any language, code or notation, of a set of instructions intended to cause a system having an information processing capability to perform a particular function either directly or after conversion to another language, code or notation, and/or reproduction in a different material form.

Thus the invention includes an article of manufacture which comprises a computer usable medium having computer readable program code means embodied therein for causing a function described above. The computer readable program code means in the article of manufacture comprises computer readable program code means for causing a computer to effect the steps of a method of this invention. Similarly, the present invention may be implemented as a computer program product comprising a computer usable medium having computer readable program code means embodied therein for causing a function described above. The computer readable program code means in the computer program product comprising computer readable program code means for causing a computer to effect one or more functions of this invention. Furthermore, the present invention may be implemented as a program storage device readable by machine, tangibly embodying a program of instructions executable by the machine to perform method steps for causing one or more functions of this invention.

It is noted that the foregoing has outlined some of the more pertinent objects and embodiments of the present invention. This invention may be used for many applications. Thus, although the description is made for particular arrangements and methods, the intent and concept of the invention is suitable and applicable to other arrangements and applications. It will be clear to those skilled in the art that modifications to the disclosed embodiments can be effected without departing from the spirit and scope of the invention. The described embodiments ought to be construed to be merely illustrative of some of the more prominent features and applications of the invention. Other beneficial results can be realized by applying the disclosed invention in a different manner or modifying the invention in ways known to those familiar with the art.

What is claimed is:

1. A method for verifying an avatar owner as a human user of an avatar in a virtual world, said method comprising:
    providing, by a server device, a communication system for establishing a virtual world environment in which users may interact through avatars, representing each one or more users visually, in said virtual world environment;
    enabling, via client devices associated with one or more users, said users to interact through their said representing avatars, said client devices and server device communicating over a network;
    detecting, by a first human user while interacting through said representative avatar in said virtual world environment, an avatar suspected by that first human user of exhibiting non-human behavior in said virtual world;
    initiating, by said first human user, a request to challenge said suspect avatar to determine whether said suspect avatar is controlled by an automated application program (bot);
    receiving, at said server device, said request for challenging said suspect avatar in said virtual world environment;
    identifying, in response to said received challenging request, a user client device associated with the suspect challenged avatar;
    generating, for display at a user client device, a Human Identification Proof (HIP) surface challenge directed at said suspect avatar in said virtual world to detect a human user versus an application program user controlling said suspect avatar, said HIP surface challenge requiring a response from said avatar;
    determining, from said response, whether said user is an application program user (bot) or a human user; and,
    preventing, at said server device, said suspect avatar from further interaction in said virtual world environment, or performing any other punitive action, when said challenged avatar is determined to be a bot.

2. The method for verifying as claimed in claim 1, further comprising:
    providing, at each client device, an interface, operable by a corresponding user, for enabling users to control their representing avatar on said corresponding client device; and,
    communicating said HIP surface challenge to said suspect avatar via a network connection for receipt at a interface of that user's corresponding client device.

3. The method for verifying as claimed in claim 2, wherein said HIP surface challenge communicated to a user client device of a suspect avatar is a Completely Automated Public Turing tests to tell Computers and Humans Apart (CAPTCHA) message, said CAPTCHA message generated for display via said interface of said suspect avatar's controlling user client device.

4. The method for verifying as claimed in claim 3, wherein said generating a HIP surface challenge is performed at said server device establishing said virtual environment, or provided by a 3$^{rd}$ party server device in communication with said server device via said network.

5. The method for verifying as claimed in claim 4, wherein said generating a HIP surface challenge is initiated by said server device establishing said virtual world environment, said CAPTCHA message generated for receipt at a user device associated with a challenged avatar.

6. The method for verifying as claimed in claim 4, further comprising:
    wherein said generating a HIP surface challenge is initiated by a user represented by a first avatar in said virtual world environment, said CAPTCHA message generated for receipt by a second challenged avatar at a corresponding user client device associated with said challenged second avatar.

7. The method for verifying as claimed in claim 6, further comprising:
    prior to surfacing said HIP challenge in said virtual world, further verifying whether said initiator of said HIP is a bot, said further verifying comprising:
    initiating, by said server device, a CAPTCHA message to a user device associated with said first avatar;
    receiving, at said server device, an response from said first avatar, said response submitted via that user's client device;
    determining, from said response provided, whether said initiator is a bot or a human user; and,
    preventing, via said server device, said first avatar from initiating a challenge in said virtual world environment when a bot initiator is determined.

8. The method for verifying as claimed in claim 1, further comprising:
    limiting, by said server device, a number of HIP challenges (HIP surfaces) before a challenged avatar is determined as a bot.

9. The method for verifying as claimed in claim 6, wherein said step of determining, from said response, whether said user or initiator is a bot or a human user comprises:
    evaluating said response according to criterion upon which automated program behavior (botting) behavior is determined, said method further comprising:
    varying, by either of said server device or said 3$^{rd}$ party server device in communication with said server device via said network, the criterion to thereby control an occurrence of false alarms to human users and an occurrence of bots that go undetermined.

10. The method for verifying as claimed in claim 9, further comprising:
    determining, by a system of users, from an avatar's interactions in said virtual world environment, and HIP challenge responses from a user or initiator, whether said avatar is a bot, said system of users comprising said first avatar, or an administrator user that who confront said second avatar if CAPTCHA is not correctly responsed.

11. The method for verifying as claimed in claim 10, further comprising:
    communicating, by said server, an escalation of HIP surface challenges or CAPTCHA messages to a user device associated with a challenged avatar, and receiving a succession of responses to verify human versus application program user, said escalation comprising issuing one or more of: issuing avatar-issued CAPTCHAs, administrator-issued CAPTCHAs, algorithms requiring avatar responses, or automated CAPTCHAs, or combinations thereof, to the challenged avatar.

12. The method for verifying as claimed in claim 11, wherein said varying a criterion comprises one or more of:
    varying the types of HIPs, varying a number of HIPs before initiating said escalation of HIP surface challenges or CAPTCHA messages, varying an accuracy criterion to determine when to pass an avatar challenge request, said criterion incorporating factors comprising one or more of: an amount of risk imposed by bots, a frequency upon which a user can be challenged to provide proof of 'humanness', a number of incorrect responses provided by a user of a challenged avatar, and an amount of time required to provide proof of 'humanness' in said response, or combinations thereof.

13. The method for verifying as claimed in claim 1, further comprising:
providing a recording device operable in conjunction with a client device;
presenting, via a interface at a client device, a CAPTCHA comprising a series of words that requiring recital from a human user into said recording device; and,
determining from said recorded user recital, presence of a human user.

14. The method for verifying as claimed in claim 13, wherein said series of words comprises words arranged within a sentence structure, a line of poetry, or lyrics from a song, a user required to recite said words via each respective client device.

15. A system for verifying an avatar owner as a human user of an avatar in a virtual world, said system comprising:
a server device for establishing a virtual world environment in which users may interact through avatars, representing each one or more users visually, in said virtual world environment
a plurality of client devices, each of said plurality corresponding to an avatar present in the virtual world environment and representing a user, each client device having an interface means operable by users, for enabling said users to interact through their said representing avatars in said virtual world environment, said client devices and server device communicating over a network connection;
said server device maintaining a list of present avatars interacting in said virtual world environment and corresponding information for identifying client computing devices operating to control said present avatars; and wherein
a human user detects, while interacting through said representative avatar in said virtual world environment, an avatar suspected by that human user of exhibiting non-human behavior in said virtual world;
said human user initiating a request to challenge said suspect avatar to determine whether said suspect avatar is controlled by an automated application program (bot);
said server device for providing computer-implemented functions for receiving said request for challenging said suspect avatar in said virtual world environment, said server device identifying, in response to said received challenging request, a user client device associated with a challenged avatar;
said server device providing computer-implemented functions for generating, for display at said user client device over a network connection, a Human Identification Proof, (HIP) surface challenge directed at said suspect avatar in said virtual world to detect a human user versus an application program user controlling said suspect avatar, said HIP surface challenge requiring a response from said avatar;
said server device receiving said response from said user client device and providing computer-implemented functions to determine, from said response provided, whether said user is an application program user (bot) or a human user; and,
said server device providing computer-implemented functions for preventing, at said server device, said suspect avatar from further interaction in said virtual world environment, or performing any other punitive action, when a bot is determined to control said challenged avatar.

16. The system for verifying as claimed in claim 15, wherein each client device is provided with an interface, operable by a corresponding user, for enabling users to control their representing avatar on said corresponding client device; and,
wherein said HIP surface challenge is communicated to said challenged avatar via a network connection for receipt at an interface of that avatar user's corresponding client device.

17. The system for verifying as claimed in claim 16, wherein said HIP surface challenge communicated to a user client device of a challenged avatar is a Completely Automated Public Turing tests to tell Computers and Humans Apart (CAPTCHA) message, said CAPTCHA message generated for display via said interface of said challenged avatar's controlling user client device.

18. The system for verifying as claimed in claim 17, further comprising:
wherein said generating a HIP surface challenge is performed at said server device establishing said virtual environment, or a $3^{rd}$ party server device in communication with said server device via said network.

19. The system for verifying as claimed in claim 15, further comprising:
a recording device, wherein a CAPTCHA presented via an interface at a client device, comprises a series of words requiring recital from a human user into said recording device; and,
determining from a recorded user recital presence of human user.

20. A non-transitory program storage device readable by machine, tangibly embodying a program of instructions executable by the machine to perform method steps for verifying an avatar interacting in a virtual world environment represents a human user, said method steps comprising:
providing, by a server device, a communication system for establishing a virtual world environment in which users may interact through avatars, representing each one or more users visually, in said virtual world environment;
enabling, via client devices associated with one or more users, said users to interact through their said representing avatars, said client devices and server device communicating over a network; and wherein,
a human user detects, while interacting through said representative avatar in said virtual world environment, an avatar suspected by that human user of exhibiting non-human behavior in said virtual world;
said human user initiating a request to challenge said suspect avatar to determine whether said suspect avatar is controlled by an automated application program (bot);
receiving, at said server device, said request for challenging an avatar in said virtual world environment;
identifying, in response to said challenging, a user client device associated with the suspect challenged avatar;
generating, for display at a user client device, a Human Identification Proof (HIP) surface challenge directed at said suspect avatar in said virtual world to detect a human user versus an application program user controlling said suspect avatar, said HIP surface challenge requiring a response from said avatar;
determining, from said response, whether said user is an application program user (bot) or a human user; and, preventing, at said server device, said suspect avatar from further interaction in said virtual world environment, or performing any other punitive action, when said challenged avatar is determined to be a bot.

* * * * *